UNITED STATES PATENT OFFICE.

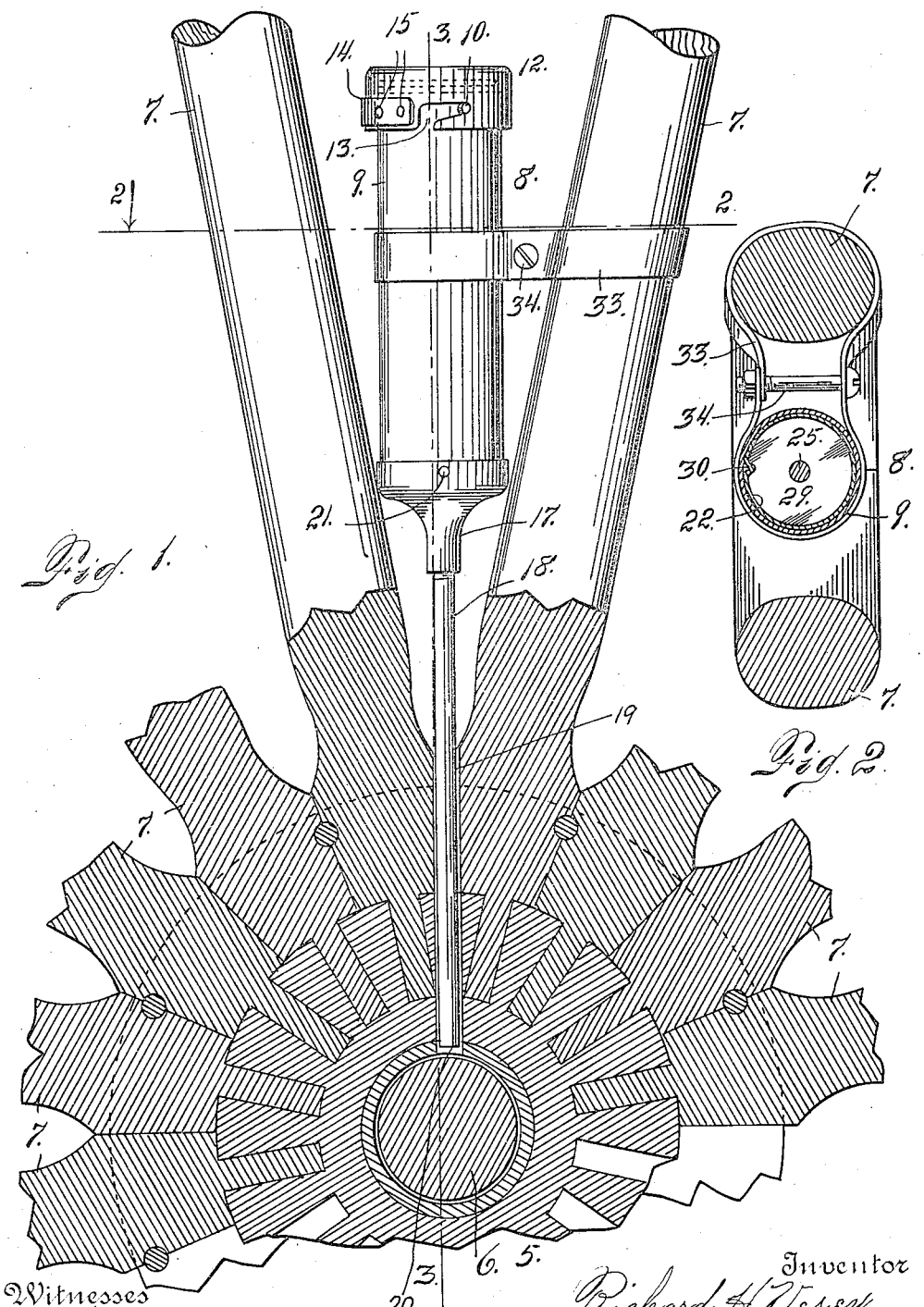

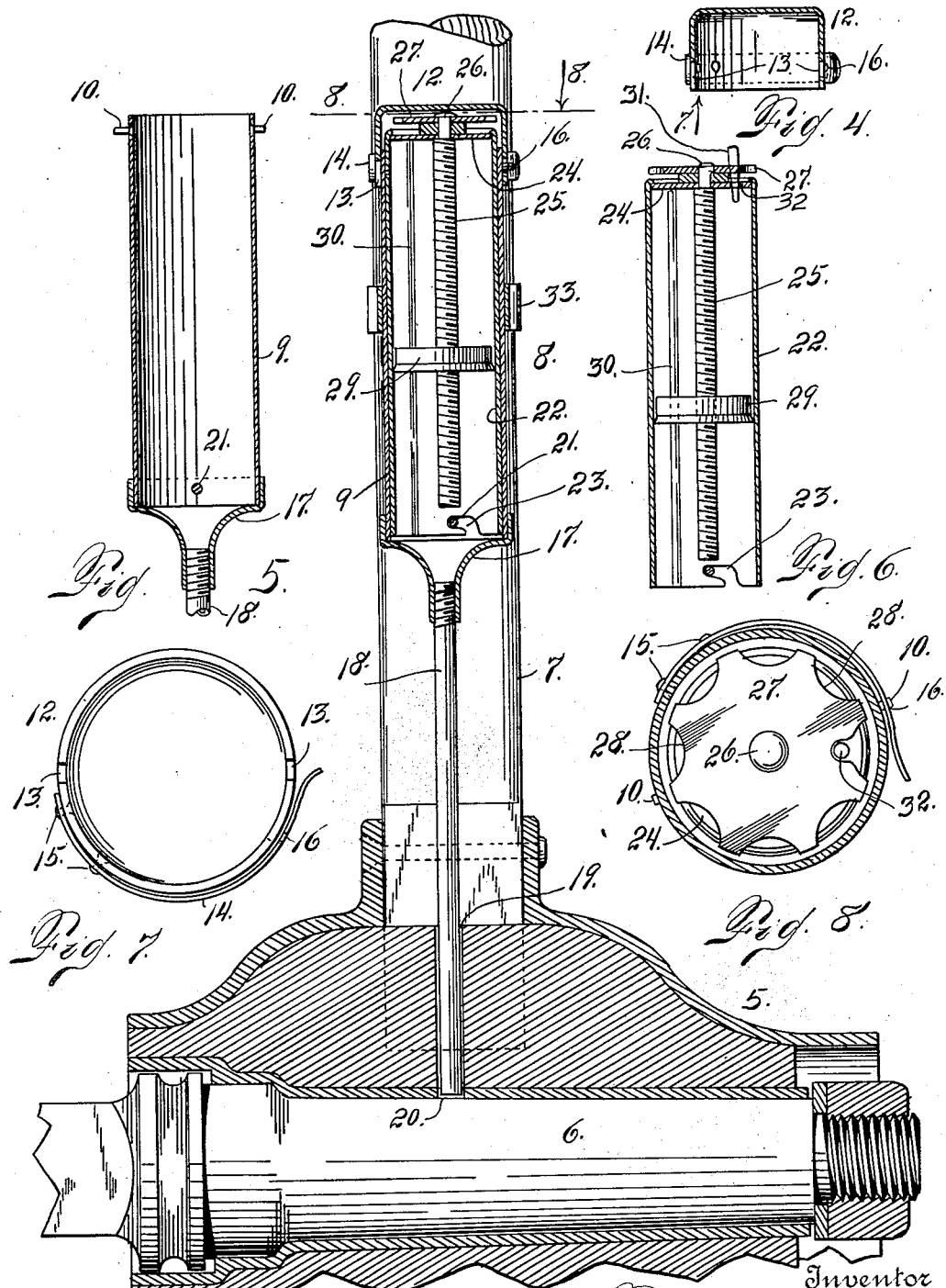

RICHARD H. VESEY, OF DENVER, COLORADO, ASSIGNOR TO THE H. & B. MANUFACTURING COMPANY, OF DENVER, COLORADO, A CORPORATION OF COLORADO.

JOURNAL-LUBRICATOR.

1,051,293.  Specification of Letters Patent.  Patented Jan. 21, 1913.

Application filed July 29, 1911. Serial No. 641,370.

*To all whom it may concern:*

Be it known that I, RICHARD H. VESEY, a citizen of the United States, residing in the city and county of Denver and State of Colorado, have invented certain new and useful Improvements in Journal-Lubricators; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in journal lubricators, and to a certain extent is analogous or related to the invention disclosed in my copending application filed February 9, 1911, Serial No. 607,577, certain differences in construction being embodied in the present invention, which will be clearly brought out as I proceed in describing the same.

The object of the present invention is to provide a journal lubricator which is more especially adapted for use in connection with the journals of vehicle axles.

Another object of my invention resides in the provision of a lubricant receptacle permanently applied to the wheel of the vehicle and in communication with the journal of the wheel.

Another object of my invention is to provide means for readily and quickly lubricating the journal of a vehicle wheel without removing the wheel from the axle.

Another object of my invention resides in the construction of the lubricant receptacle, whereby the closure for the receptacle may readily and quickly be removed and applied.

Another object of my invention is to provide a fastening means for the cover of the lubricant receptacle which will securely hold or retain the said cover in position upon the receptacle.

Another object of my invention is to provide means for conveniently forcing the lubricant from the receptacle to the journal of the wheel.

To enable others skilled in the art to which my invention appertains, to make and use my invention, I will proceed to describe its construction and mode of operation, reference being made to the accompaying drawing, in which is illustrated an embodiment thereof.

In this drawing: Figure 1 is an elevation of my improved lubricating device, illustrating its application to a wheel of a vehicle shown partly broken away and partly in section. Fig. 2 is a cross-section taken on the line 2—2, Fig. 1, looking in the direction of the arrow. Fig. 3 is a section taken on the line 3—3, Fig. 1. Fig. 4 is a sectional view of the cap or cover employed for the lubricant receptacle. Fig. 5 is a longitudinal section of the lubricant receptacle with the cover removed. Fig. 6 is a longitudinal section of the inner tube for the lubricant receptacle, illustrating the plunger for forcing the lubricant out of the receptacle. Fig. 7 is an under side view of the cap or cover for the receptacle, looking in the direction of the arrow 7, Fig. 4. Fig. 8 is a top plan view taken on the line 8—8, Fig. 3, and looking in the direction of the arrow.

The same reference characters indicate the same parts in all the views.

Let the numeral 5 designate the hub of a wheel, 6 the journal, and 7 the spokes. Between two of the spokes I arrange my lubricant receptacle, designated in its entirety by the numeral 8. This receptacle comprises an outer shell 9, provided with projections 10 at its upper extremity. To the upper exteremity of the outer shell 9 is applied a cap 12 having recesses 13 formed therein, and which recesses are adapted to receive the projections 10, and thus form a sort of bayonet joint connection with the outer shell 9 of the receptacle. To the outer side of the cap 12 is applied a spring 14, rigidly secured at its extremity 15 to the cap and partially surrounding the cap, and having its opposite extremity free. The free extremity of the said spring being provided with an opening 16 adapted to receive one of the projections 10 when the cap is in place. The free extremity of the spring beyond the opening 16 is slightly curved outwardly to enable the spring to be actuated by the fingers, to disengage the same from the projections 10 for removing the cover. To the lower end of the shell 8 is secured a funnel-shaped part 17, tapering downwardly, its lower extremity being interiorly threaded to receive the upper threaded extremity of a relatively small tube 18 which passes through an opening 19 formed in the hub, the lower extremity of the tube, which is open-ended, terminating in close proximity to the journal 6. The inner metallic part of the hub is perforated, as shown at 20, to receive the inner extremity of this tube. Passed transversely through the lower extremity of the outer shell 9, is a pin or bar 21. Located within the shell 9, is a lubricant-holding tube 22, whose lower extremity is provided with angular slots or recesses 23, which form a bayonet joint connection with the pin or bar 21, whereby the said tube is locked against both rotary and longitudinal movement within the shell, when the pin or bar 21 is received within the recesses 23 and the tube turned to its limit of movement. The inner extremity of the tube 22 is open, while its upper extremity is provided with a closure 24, in which closure the upper extremity of a screw 25 is journaled. This screw has a part 26 protruding through the closure 24, to which part an actuating member 27 is secured. This actuating member is scalloped around its edges, as shown at 28, thus making convenient finger holds for grasping the actuating member for operating the screw. By virtue of this construction, the screw may be freely rotated in the closure without turning the tube. Threaded upon the screw, within the lubricant tube, is a plunger or follower 29. This follower is prevented from turning in the tube by virtue of a tongue and groove connection between the tube and the plunger, the tube having an inwardly protruding tongue 30 which enters the groove formed in the edge of the plunger. In use the lubricant-containing tube 22 is first removed from the outer shell 9, and filled with the lubricant to be employed, such lubricant preferably being of relatively hard substance which will only move toward the axle when forced by the plunger.

In order to remove the tube 22, the cap 12 is first removed from the outer shell 9. After the cap 12 has been removed, I insert a pin or nail 31 into an opening 32 formed in the closure of the tube. This nail or pin is engaged by the actuating member 27, and thus holds the latter against turning independently of the tube 22. When this actuating member 27 is thus locked against turning independently of the tube, the tube 21 is given a partial turn, whereby the horizontal portions of the slot 23 are disengaged from the bar 21, and the tube may then be pulled straight out of the shell, by using the actuating member as a handle.

An important feature of this invention resides in the incasing of the actuating member 27 by means of the cap 12. By virtue of this construction the lubricating receptacle is rendered practically dust proof, and protected against the injurious effects of exposure.

The particular construction of the locking means for the cap enables me to conceal the actuating member 27 in this manner. Heretofore, it has been found to be necessary to have an opening through the cap or closure, through which the screw protrudes. The screw assists in the locking of the cap in position upon the receptacle. However, by the provision of my locking means, this cap may be firmly locked in position upon the receptacle, and thus obviate the necessity of an opening in the cap, through which some part of the screw protrudes for assisting in locking the cap.

Preparatory to charging the tube 22, it is, of course, necessary that the plunger be raised to the top of the tube in order that the latter may receive a full charge of the lubricant. When this has been done, the tube is pressed into a body of hard lubricant with its open extremity foremost. In this manner the tube is filled with the lubricating material, and after thus being filled it is reinserted in the shell and interlocked with the bar 21, by the employment of the bayonet joint connection, as heretofore explained. The cap 12 is then applied to the shell, and interlocked with the projections 10, by giving the same a slight turn, whereby the free extremity of the spring 14 rides up over one of the projections 10 until the opening 16 is brought adjacent one of the projections 10, whereby the projection is allowed to enter the said opening and form a locking means for the cap. Now, whenever it becomes necessary to force the lubricant from the receptacle, it is only necessary to lift the spring 14 out of engagement with the projection 10, and give the cap a slight turn toward the left, whereby the horizontal portion of the slots or recesses 13 are disengaged from the projections 10. The cap may then be lifted out of engagement with the shell. The turning of the cap and the releasing of the spring from the projection 10, are accomplished by the same action, since when the free extremity of the spring is pressed outwardly, the cap is given the desired turn by the direct influence of the pressure applied to the spring in releasing the same from engagement with the pin. After the cap has been removed the actuating member 27 is exposed so that the same may be grasped by the fingers and turned, thus causing the screw to turn. As the screw is rotated the plunger is caused to travel outwardly in the tube, since it is locked against turning in the tube, as heretofore explained. In this manner the lubricant is forced out of its receptacle through the small tube 18 and delivered to the journal 6. After the desired quantity of lubricant has been forced to the journal 6, the cap is again applied to the outer shell 9, and locked in position, as heretofore explained.

As illustrated in the drawing, the lubricant receptacle is connected with one of the spokes 7, by a band 33 passed respectively around one of the spokes 7 and the lubricant receptacle, the extremities of the band 33 meeting between the said spoke and the lubricant receptacle. A bolt 34 is passed through the meeting extremities of the band, thus forming a connection for the same, the said bolt being also passed through the opposite sides of the band. To this bolt is applied a nut which may be tightened and result in drawing the opposite sides of the band toward each other, between the spoke and the lubricant receptacle, thus tightening the same for firmly clamping the said lubricant receptacle in position.

While I have described and illustrated a specific construction of my invention, it is understood that the same may be deviated from without departing from the spirit of the invention.

Having thus described my invention, what I claim is:

The combination with a relatively stationary shell open at its outer extremity, of a lubricant-containing tube inserted therein and interlocked therewith, a screw journaled in the outer extremity of the tube which is closed, the outer extremity of the screw protruding beyond the closure of the tube and having a scalloped actuating member secured thereto, the closed extremity of the tube having an opening therein adapted to be brought into register with one of the scallops of the actuating member, and a nail or pin adapted to be inserted in said opening and received by one of the scallops to facilitate the turning of the tube within the shell, for the purpose set forth.

In testimony whereof I affix my signature in presence of two witnesses.

RICHARD H. VESEY.

Witnesses:
C. E. BRADEN,
F. E. BOWEN.